(12) United States Patent
Rothlisberger et al.

(10) Patent No.: US 11,886,923 B2
(45) Date of Patent: Jan. 30, 2024

(54) COMPUTERIZED SYSTEM FOR USER-DIRECTED CUSTOMIZATION AND USER INTERFACE TRANSFORMATION

(71) Applicant: TD Ameritrade IP Company, Inc., Omaha, NE (US)

(72) Inventors: Travis Rothlisberger, San Diego, CA (US); Sohaib Saeed, Monmouth Junction, NJ (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 171 days.

(21) Appl. No.: 17/100,901

(22) Filed: Nov. 22, 2020

(65) Prior Publication Data
US 2022/0164238 A1    May 26, 2022

(51) Int. Cl.
| G06F 3/04847 | (2022.01) |
| G06F 16/9035 | (2019.01) |
| G06F 9/50 | (2006.01) |
| G06F 9/38 | (2018.01) |
| G06F 16/9038 | (2019.01) |

(52) U.S. Cl.
CPC ........ G06F 9/5055 (2013.01); G06F 3/04847 (2013.01); G06F 9/3836 (2013.01); G06F 16/9035 (2019.01); G06F 16/9038 (2019.01)

(58) Field of Classification Search
CPC .. G06F 9/3836; G06F 9/5055; G06F 16/9035; G06F 16/9038; G06F 3/04847
See application file for complete search history.

(56) References Cited

U.S. PATENT DOCUMENTS

| 6,601,044 B1 * | 7/2003 | Wallman | G06Q 40/10 705/37 |
| 6,901,383 B1 * | 5/2005 | Ricketts | G06Q 40/04 705/37 |
| 7,080,328 B1 * | 7/2006 | Sawyer | G06Q 40/06 707/999.005 |
| 7,689,493 B1 * | 3/2010 | Sullivan | G06Q 40/06 705/36 R |
| 8,725,618 B1 * | 5/2014 | Menzer | G06Q 40/06 705/36 R |

(Continued)

Primary Examiner — Kavita Stanley
Assistant Examiner — William Wong
(74) Attorney, Agent, or Firm — Harness, Dickey & Pierce, P.L.C.

(57) ABSTRACT

A system includes a processor and memory that stores asset identifiers. The asset identifiers correspond to a respective index and a respective category. The memory stores instructions for execution by the processor. The instructions include, in response to receiving a request signal from a user device, obtaining a set of asset identifiers corresponding to a first index indicated in the request signal and filtering the set of asset identifiers based on a first category indicated in the request signal. The instructions include generating an adjusted set of asset identifiers by, for each category represented in the filtered set of asset identifiers, adjusting a representation ratio of the asset identifiers associated with the corresponding category in response to the request signal including the representation ratio associated with the corresponding category, and transforming an interface of the user device by rendering a graphical depiction of the adjusted set of asset identifiers.

20 Claims, 9 Drawing Sheets

(56) References Cited

U.S. PATENT DOCUMENTS

| | | | |
|---|---|---|---|
| 2002/0133446 A1* | 9/2002 | Lee | G06Q 40/04 |
| | | | 705/36 R |
| 2003/0093348 A1* | 5/2003 | Finn | G06Q 40/025 |
| | | | 705/35 |
| 2008/0077539 A1* | 3/2008 | Drain | G06Q 40/04 |
| | | | 705/37 |
| 2012/0203766 A1* | 8/2012 | Hornkvist | G06F 16/285 |
| | | | 707/E17.016 |
| 2014/0365399 A1* | 12/2014 | Dennelly | G06Q 40/06 |
| | | | 705/36 R |
| 2016/0343078 A1* | 11/2016 | Vaidyanathan | G06Q 40/06 |
| 2021/0090169 A1* | 3/2021 | Wang | H04L 63/102 |

* cited by examiner

Custom Portfolio

Profile

Historical Tracking Error: 3.25%

Weighted Average Yield: .55%

Number of Holdings: 152

Show All — 504

Top 5 Holdings

| Symbol | Name | Sector | Price | Allocation |
|---|---|---|---|---|
| XYZ1 | Security 1 | Information Technology | $298.39 | 4.95% |
| XYZ2 | Security 2 | Consumer Discretionary | $1,906.86 | 4.92% |
| XYZ3 | Security 3 | Financials | $225.92 | 4.88% |
| XYZ4 | Security 4 | Communication | $213.06 | 4.67% |
| XYZ5 | Security 5 | Comunication | $1,393.34 | 4.62% |

Execute — 508

FIG. 5

COMPUTERIZED SYSTEM FOR USER-DIRECTED CUSTOMIZATION AND USER INTERFACE TRANSFORMATION

FIELD

The present disclosure relates to user interfaces and more particularly to systems and methods for generating a customized data set based on existing database index entries.

BACKGROUND

Many users look to indexes as a way to measure and gauge market performance. However, it is very difficult and labor intensive for a user or analyst to learn how an index is actually constructed and then construct a user portfolio to match the index. As it stands, the user has to log in and search through the index to write down what securities are included in the index and how much each security is weighted relative to the other securities. This process is manual and labor intensive for the user.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and memory coupled to the at least one processor. The memory stores a parameter database including asset identifiers. Each of the asset identifiers corresponds to (i) a respective index and (ii) a respective category. The memory stores instructions for execution by the at least one processor. The instructions include, in response to receiving a request signal from a user device, obtaining, from the parameter database, a set of asset identifiers corresponding to a first index indicated in the request signal and filtering the set of asset identifiers based on a first category indicated in the request signal. The instructions include generating an adjusted set of asset identifiers by, for each category represented in the filtered set of asset identifiers, adjusting a representation ratio of the asset identifiers associated with the corresponding category in response to the request signal including the representation ratio associated with the corresponding category and transforming an interface of the user device by rendering a graphical depiction of the adjusted set of asset identifiers.

In other features, the instructions include transforming the interface of the user device by rendering a graphical depiction of the representation ratio of the corresponding asset identifier and the graphical depiction is represented as a percentage.

In other features, the instructions include reducing a total number of asset identifiers included in the set of asset identifiers based on a requested number of assets included in the request signal.

In other features, the instructions include determining a number of asset identifiers in the set of asset identifiers and, in response to a requested number of assets being less than the number of asset identifiers in the set of asset identifiers, removing asset identifiers from the set of asset identifiers based on a type indication included in the request signal.

In other features, the instructions include adding an asset identifier to the set of asset identifiers in response to (i) the request signal identifying the asset identifier and (ii) the set of asset identifiers excluding the asset identifier.

In other features, the instructions include removing an asset identifier from the set of asset identifiers in response to the request signal indicating an exclusion of the asset identifier.

In other features, the instructions include calculating performance metric comparisons for the adjusted set of asset identifiers and the index over a threshold period and displaying the performance metric comparisons on the interface.

In other features, the instructions include graphing at least one of the performance metric comparisons of the adjusted set of asset identifiers and the index on a chart and displaying the chart on the interface.

In other features, the instructions include identifying each asset of the adjusted set of asset identifiers including a loss of an amount. The loss is over a threshold period. In other features, the instructions include summing, for the adjusted set of asset identifiers, an overall loss and displaying the overall loss on the interface.

In other features, the filtering the set of asset identifiers based on the first category includes at least one of including a first asset identifier of the set of asset identifiers if the first asset identifier corresponds to the first category and excluding the first asset identifier of the set of asset identifiers if the first asset identifier corresponds to the first category.

A method includes, in response to receiving a request signal from a user device, obtaining, from a parameter database, a set of asset identifiers corresponding to a first index indicated in the request signal. The parameter database includes asset identifiers. Each of the asset identifiers corresponds to (i) a respective index and (ii) a respective category. The method includes filtering the set of asset identifiers based on a first category indicated in the request signal and generating an adjusted set of asset identifiers by, for each category represented in the filtered set of asset identifiers, adjusting a representation ratio of the asset identifiers associated with the corresponding category in response to the request signal including the representation ratio associated with the corresponding category. The method includes transforming an interface of the user device by rendering a graphical depiction of the adjusted set of asset identifiers.

In other features, the method includes transforming the interface of the user device by rendering a graphical depiction of the representation ratio of the corresponding asset identifier. The graphical depiction is represented as a percentage.

In other features, the method includes reducing a total number of asset identifiers included in the set of asset identifiers based on a requested number of assets included in the request signal.

In other features, the method includes determining a number of asset identifiers in the set of asset identifiers and, in response to a requested number of assets being less than the number of asset identifiers in the set of asset identifiers, removing asset identifiers from the set of asset identifiers based on a type indication included in the request signal.

In other features, the method includes adding an asset identifier to the set of asset identifiers in response to (i) the request signal identifying the asset identifier and (ii) the set of asset identifiers excluding the asset identifier.

In other features, the method includes removing an asset identifier from the set of asset identifiers in response to the request signal indicating an exclusion of the asset identifier.

In other features, the method includes calculating performance metric comparisons for the adjusted set of asset identifiers and the index over a threshold period and displaying the performance metric comparisons on the interface.

In other features, the method includes graphing at least one of the performance metric comparisons of the adjusted set of asset identifiers and the index on a chart and displaying the chart on the interface.

In other features, the method includes identifying each asset of the adjusted set of asset identifiers including a loss of an amount. The loss is over a threshold period. In other features, the method includes summing, for the adjusted set of asset identifiers, an overall loss and displaying the overall loss on the interface.

In other features, the filtering the set of asset identifiers based on the first category includes at least one of including a first asset identifier of the set of asset identifiers if the first asset identifier corresponds to the first category and excluding the first asset identifier of the set of asset identifiers if the first asset identifier corresponds to the first category.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5 is a representation of an example user interface of a custom portfolio.

In the drawings, reference numbers may be reused to identify similar and/or identical elements.

DETAILED DESCRIPTION

Figure 1:
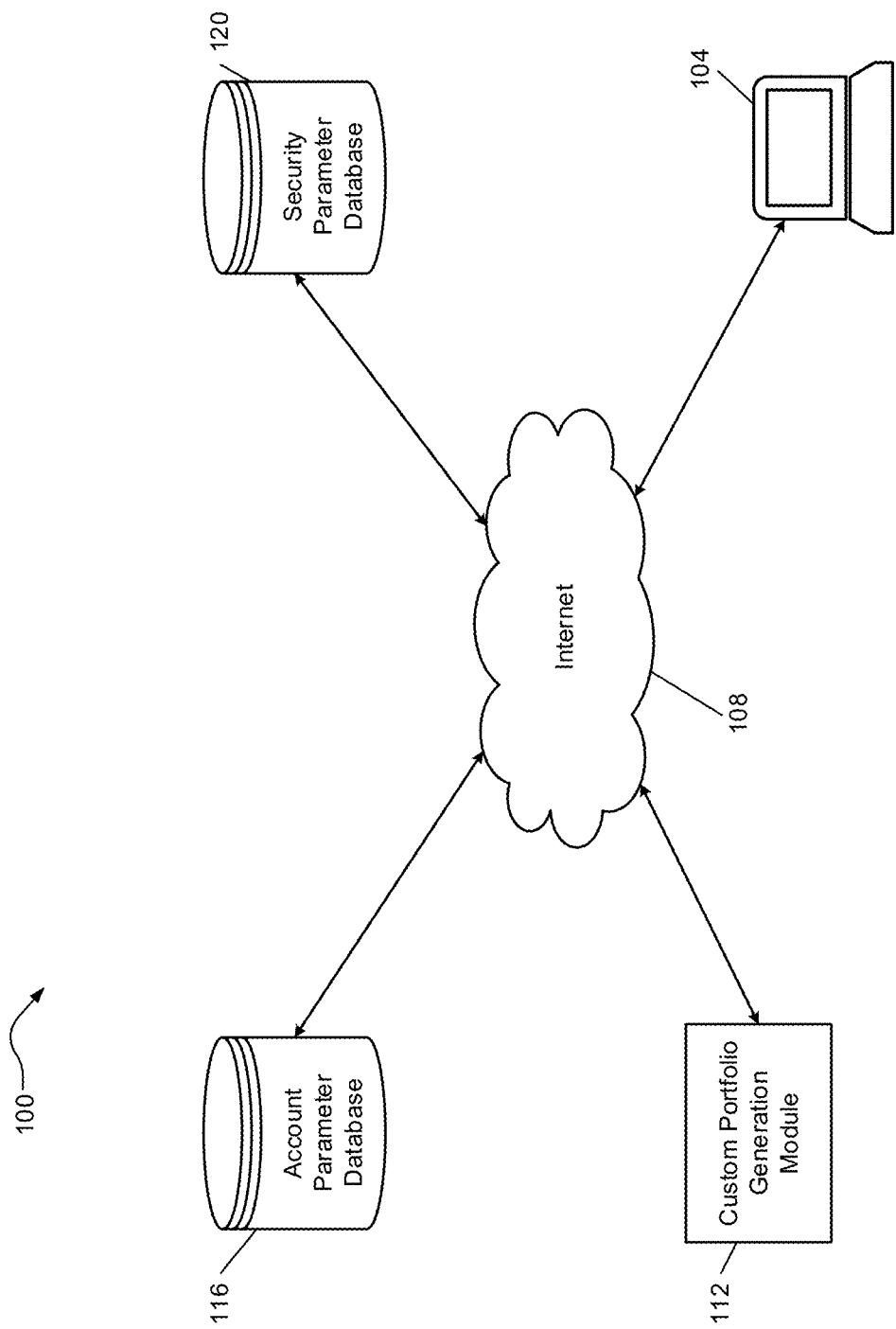
FIG. 1 is a high-level example block diagram of a custom portfolio generation system.

A custom portfolio generation system generates a custom portfolio including a set of securities to mimic or replicate a selected index. The custom portfolio generation system provides users with the opportunity to create a unique and custom portfolio that matches a particular index such as, for example, the S&P 500 index, the Dow Jones Industrial, the FTSE 100 index, etc. Moreover, the custom portfolio generation system offers users options regarding the number of securities, the types of sectors the custom portfolio will include, custom security allocation, etc.

Presently, financial institutions offer zero trading commission fees. Therefore, instead of purchasing an index, such as the S&P 500 index, which includes an expense ratio and trade costs, the custom portfolio generation system creates a custom portfolio for the user based on the selected index, avoiding the previously listed fees associated with the index. However, if a user were to create their own custom index, the user would face challenges based on the sheer number of securities in an index as well as adjusting the index according to their preferences, such as excluding a particular sector, matching the user's risk tolerance, etc.

Therefore, the custom portfolio generation system receives the user's selected index and customization settings to generate the custom portfolio, allowing the user to execute the purchase of the securities included in the custom index. In various implementations, the user is an analyst, providing individuals with financial portfolio assistance. Additionally or alternatively, the user may be the individual that is purchasing the underlying securities included in the custom portfolio.

The custom portfolio generation system generates the custom portfolio based on the risk profile of the selected index and the securities included in the index. That is, the user selects which index the custom portfolio should be modeled after. The custom portfolio generation system may create the custom portfolio only based on the selected index. However, the custom portfolio generation system may also receive personalized parameters from the user. For example, the user may select a maximum number of securities to ensure that the custom portfolio generation system does not incorporate too many securities in the custom portfolio that would overwhelm review by the user. The maximum number of securities may be 100, 150, 200, etc. In various implementations, the user may input a custom maximum number of securities.

The user may also select sectors to incorporate into or exclude from the custom portfolio. For example, the custom portfolio generation system may include a webpage when the user is creating the custom portfolio to input which sectors to include, along with how much of that sector to include, as well as the ability to exclude one of the sectors. The sectors may include consumer discretionary, consumer staples, energy, financials, health care, industrials, information technology, materials, real estate, telecommunication services, utilities, etc.

Additionally, the custom portfolio generation system offers users the ability to include or exclude specific securities. For example, if the user wanted security XYZ to be included, the user can indicate that during creation. Similarly, if the user did not want security XYZ included, the user may also indicate the exclusion of security XYZ during setup. Moreover, the user can specify an allocation of specific securities as well. For example, the user can instruct the custom portfolio generation system to include security XYZ and specify that 5% of the custom portfolio is to be allocated to XYZ. In various implementations, the user can indicate a range of allocation, such as at least 2% and no more than 5% of security XYZ.

In various implementations, the custom portfolio generation system not only creates the custom portfolio but also determines, for the custom portfolio, a tracking error, a weighted yield, and a tax harvest potential value. The tracking error indicates how different the performance of the custom portfolio is from the selected index after which the custom portfolio was modeled.

The weighted yield indicates a weighted return of each of the securities included in the custom portfolio. The tax harvest potential value represents an amount of losses that the user could sell to offset realized gains. For example, the custom portfolio generation system can calculate at, for example, the beginning of each day an amount of losses that can be claimed within the custom portfolio. Then, the user can select a harvest button that navigates the user to another webpage listing the securities within the custom portfolio to sell to realize the loss.

Further, the custom portfolio generation system recalculates the above values upon user request. In various implementations, the custom portfolio generation system also monitors whether the listed values are within a threshold range that is set by the user. Based on whether the values are in or out of range, the custom portfolio generation system can alert the user, allowing the user to adjust the custom portfolio by re-optimizing or rebalancing when their portfolio is out of range. In various implementations, the user may select a re-optimize button to generate an updated portfolio based on the original instructions used to generate the present custom portfolio.

In various implementations, due to changes in security prices, the allocations in the custom portfolio may have adjusted and become out of range of the original parameters provided by the user. Therefore, the user may periodically rebalance the custom portfolio. Additionally or alternatively, the custom portfolio generation system may generate and transmit an alert to the user if the custom portfolio becomes out of range according to the original allocations. Similar alerts may be generated if tracking error or the weighted yield fall out of range. In various implementations, the user may set thresholds for prices of specific securities to be alerted when the price falls or rises beyond the threshold. Once the custom portfolio generation system creates the custom portfolio, the user can review the custom portfolio and execute the trades.

FIG. 1 is a high-level example block diagram of a custom portfolio generation system 100. A user can access their accounts with a financial entity using a user device 104, such as a mobile phone, tablet, laptop, etc. The user can generate custom portfolios by accessing, via the Internet 108, a custom portfolio generation module 112. The custom portfolio generation module 112 is maintained and operated by the financial entity. The custom portfolio generation module 112 retrieves data stored in an account parameter database 116 and a security parameter database 120 to generate a custom portfolio based on an indicated index.

The account parameter database 116 stores user account information including any securities the user has sold or purchased, user demographics, etc. Further, the account parameter database 116 stores custom portfolios built by the custom portfolio generation module 112 that the user has executed or saved for themselves or another individual. In this way, the custom portfolio generation module 112 can transform a user interface of the user device 104 to display a custom portfolio dashboard. The custom portfolio dashboard includes performance metrics of the custom portfolio along with a tracking error, a weighted yield, and a tax harvest potential, as described above.

The security parameter database 120 stores information about securities available for purchase or sale, including historical price, volume of purchases/sales, volatility, etc. Additionally, the security parameter database 120 includes indicators for each security indicating which index or indices to which the security belongs as well as the sector category to which the security belongs. The custom portfolio generation module 112 obtains the underlying securities of a selected index from the security parameter database 120 (using the indicators corresponding to the securities) to generate the custom portfolio.

Figure 2:
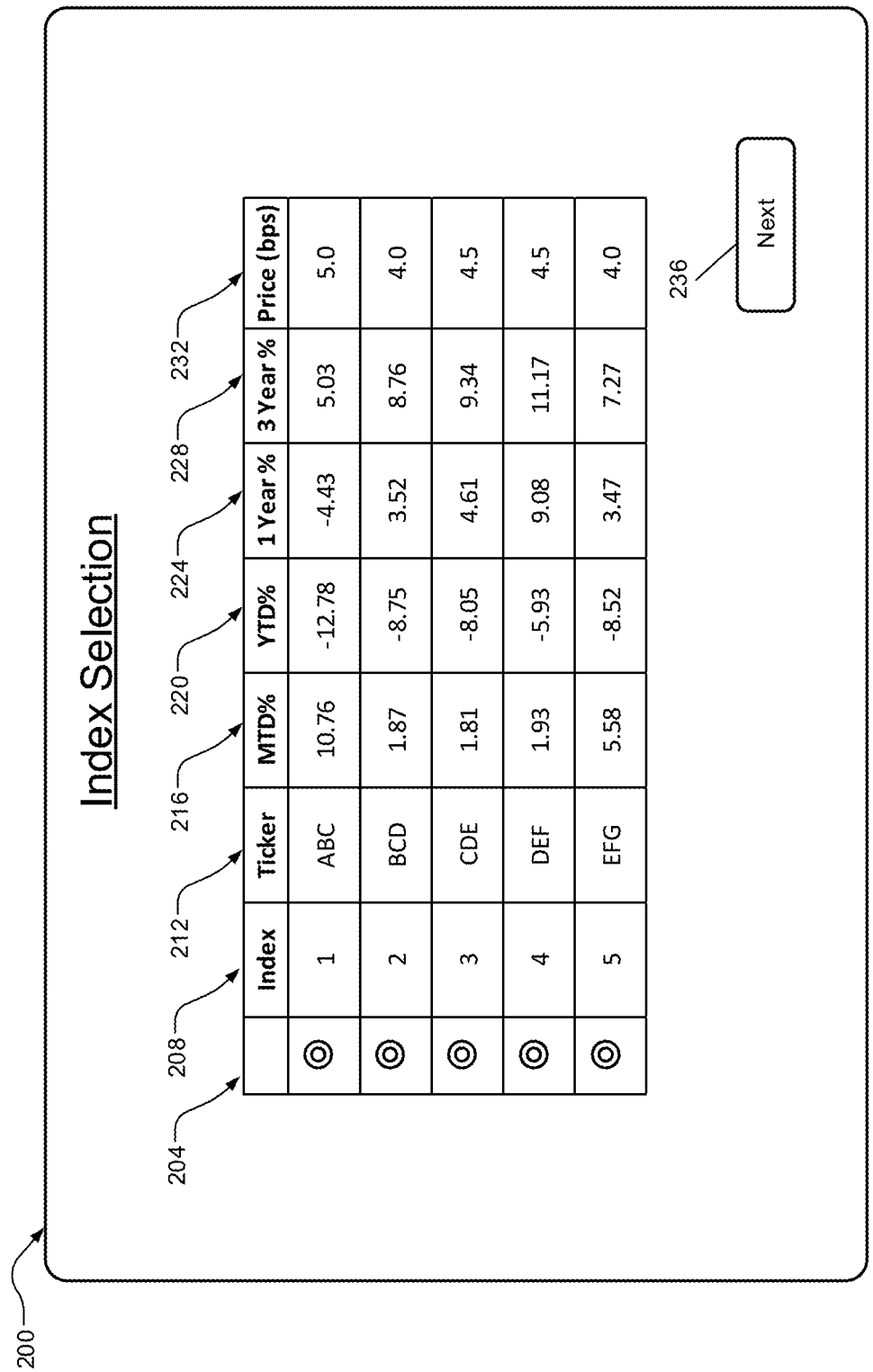
FIG. 2 is a representation of an example user interface for index selection to generate a custom portfolio.

FIG. 2 is a representation of an example user interface for index selection to generate a custom portfolio. During generation of a custom index, the user is presented with a variety of customizable options. An index selection page 200 shown in FIG. 2 provides users with a number of indices. The user can select a radio button from a radio button column 204 to indicate which index the user would like their custom portfolio to be modeled after, such as index 1, 2, 3, 4, or 5 listed in an index column 208.

The index selection page 200 includes a variety of information about each index, including a corresponding ticker in a ticker column 212, a month to date percentage change of the corresponding index in an MTD column 216, a year to date percentage change of the corresponding index in a YTD column 220, a one year percentage change in a one year column 224, a three year percentage change in a three year column 228, and a price in basis points (bps) in a price column 232. The price in bps provides the user with an additional measure of overall performance of the index, indicating an overall change of the index. After analyzing the performance information provided, the user can select the radio button of the index to direct the generation of the custom portfolio. Then, the user can select a next button 236 to generate or customize the custom portfolio.

Figure 3:
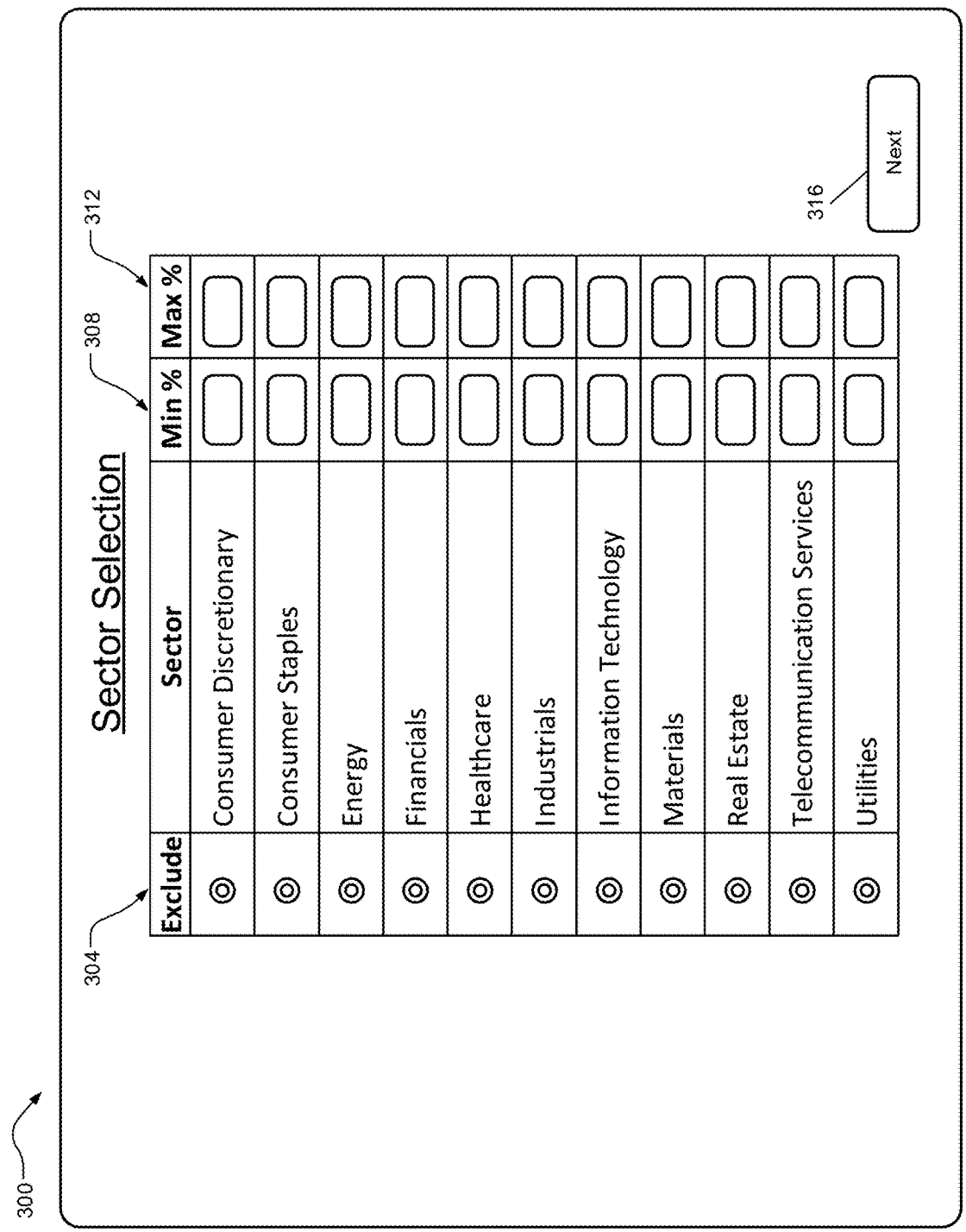
FIG. 3 is a representation of an example user interface for sector selection to generate a custom portfolio.

FIG. 3 is a representation of an example user interface for sector selection to generate a custom portfolio. A sector selection page 300 may also be presented to the user during generation of the custom portfolio. The sector selection page 300 lists a variety of sectors, including consumer discretionary, consumer staples, energy, financials, healthcare, industrials, information technology, materials, real estate, telecommunication services, and utilities. Additional or fewer sectors may be presented to the user. In an exclude column 304, the user can select whether to entirely exclude securities within the selected sector. For example, if the user did not want the custom portfolio to include any securities categorized within the real estate sector, the user would select the corresponding exclude radio button.

A minimum percentage column 308 and a maximum percentage column 312 also offer the user the opportunity to control an allocation of securities within the particular sector to include in the custom portfolio. For example, if the user would like the custom portfolio to allocate at least 10% of the custom portfolio to securities within the information technology sector, the user can enter 10 into the corresponding row of the minimum percentage column 308.

Similarly, if the user would like to limit how many securities are included in the custom portfolio within the real estate sector, the user could type 5 in the maximum percentage column 312 of the real estate row to ensure the custom portfolio includes no more than 5% allocation of securities within the real estate sector. After customizing the types of securities in the custom portfolio, the user can select a next button 316 to continue to generate or customize the custom portfolio. While the sector selection page 300 depicts the exclude column 304, the sector selection page 300 could replace the exclude column 304 with an include column.

Figure 4:
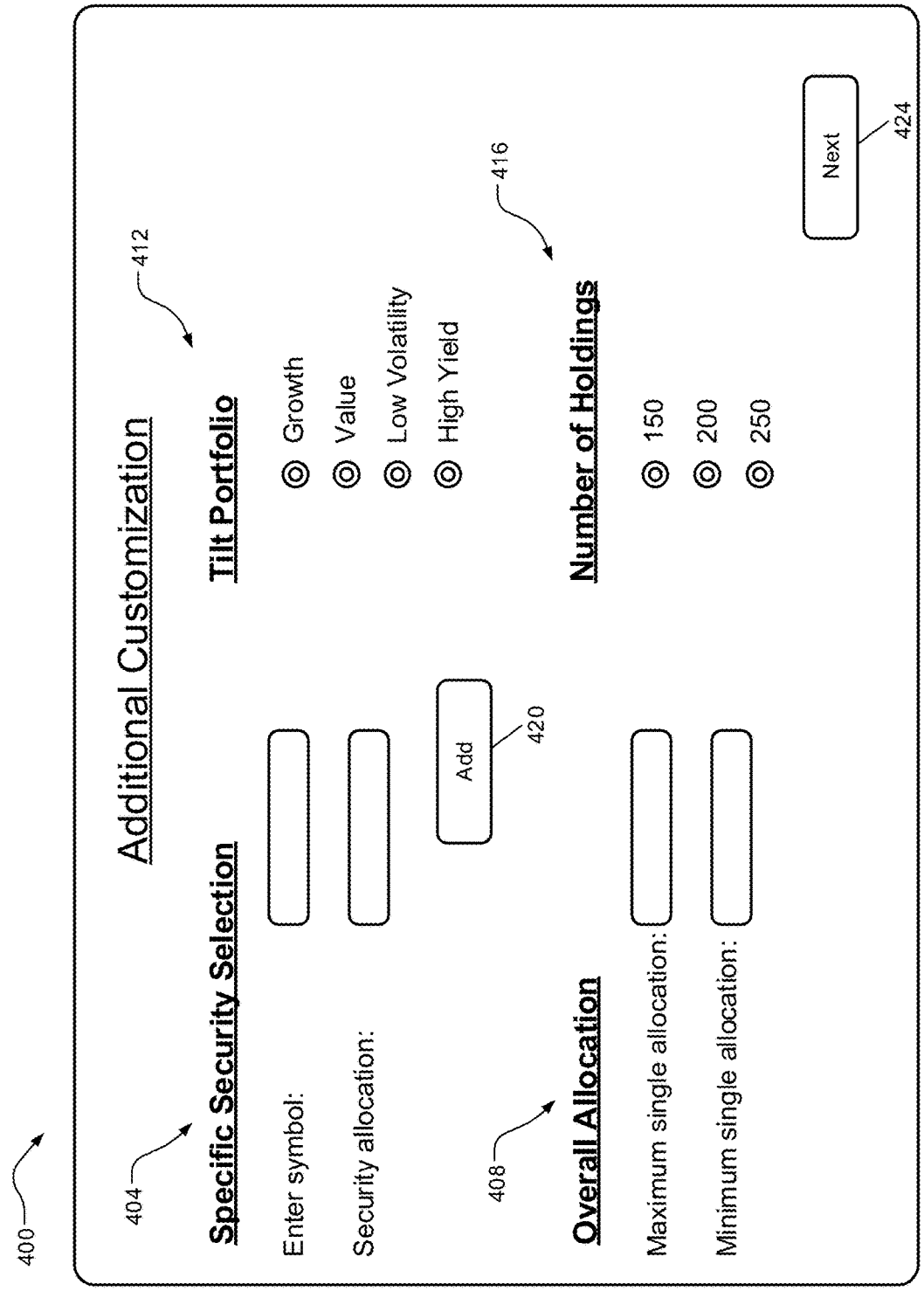
FIG. 4 is a representation of an example user interface for customization of a custom portfolio.

FIG. 4 is a representation of an example user interface for customization of a custom portfolio. An additional customization page 400 includes additional customizations of the custom portfolio for the user to adjust. The additional customization page 400 includes a specific security selection section 404, an overall allocation section 408, a tilt portfolio section 412, and a number of holdings section 416.

The specific security selection section 404 provides the user with the option of adding a particular security to the custom portfolio. The user may enter a symbol of the particular security as well as an allocation, indicating how much percentage of the custom portfolio the user would like the security to account for. In various implementations, the security allocation amount may be configured to receive a number of shares of the security. Additionally or alternatively, the security allocation may be left blank. Then, the user can select an add button 420 to add the security to the custom portfolio.

Once added, the specific security selection section adds another empty "enter symbol" field and "security allocation" field, allowing the user to add multiple individual securities. In various implementations, the additional customization page 400 also includes a specific security exclusion section, allowing the user to remove a particular security. In various implementations, the user may enter a security symbol and allocate zero percentage of the custom portfolio to exclude the security.

The overall allocation section 408 allows the user to set a maximum and a minimum allocation for any of the securities included in the custom portfolio. For example, to ensure diversification, the user may elect to set a maximum allocation for any single security to 5%. Similarly, the minimum allocation for any single security may be set to 0.5% to ensure the security is represented in the custom portfolio.

The tilt portfolio section 412 provides the user with the ability to tilt the portfolio based on growth, value, low volatility, or high yield by selecting a corresponding radio button. In general, tilting a portfolio overweighs or over allocates the portfolio according to a type of investment strategy. Therefore, if the user selects to tilt the custom portfolio to low volatility investments, the tilt portfolio section 412 provides such an option. In various implementations, additional tilt options may be listed on the additional customization page 400. Alternatively, upon selection of style, a subsequent page may list each style of investment from which the user can further select the tilt applied to the custom portfolio.

Tilting the custom portfolio based on growth indicates that the user prefers securities that are anticipated to grow at a higher rate than average. Additionally, tilting towards value indicates the user prefers value stocks. Tilting the custom portfolio based on low volatility adjusts the custom portfolio to include low volatility securities. Tilting the custom portfolio according to the high yield adjusts the custom portfolio to target a high yield percentage, such as 4%.

The number of holdings section 416 allows a user to indicate a number of holdings to include in the custom portfolio. In various implementations, the custom portfolio generation system will include a number of holdings five above or five below the number of holdings indicated by the user. Alternatively, the user may indicate a minimum or a maximum number of holdings. The user selects a next button 424 to generate the custom portfolio based on the selections made by the user. The number of holdings represents a number of different securities included in the custom portfolio.

FIG. 5 is a representation of an example user interface of a custom portfolio. Once the user inputs the selections and customizations shown in FIGS. 2-4, the custom portfolio generation system generates the custom portfolio and transforms a user interface to display a custom portfolio page 500 as shown in FIG. 5. The custom portfolio page 500 provides the user with profile information, including a historical tracking error, a weighted average yield, and a number of holdings. In various implementations, the profile provides the above values based on the performance of the combination of the custom portfolio over a previous period such as, for example, six months.

The custom portfolio page 500 also includes a section of top holdings. In the example shown, the top five holdings are listed, including which sector the security belongs to, a price of the security, and an allocation amount. The user may select a show all button 504 to see all 152 holdings. The user may review the custom portfolio designed for the user and depicted on the custom portfolio page 500. Once reviewed, the user may select an execute button 508 to execute the purchasing of the securities included in the custom portfolio. In various implementations, the custom portfolio may be uploaded to a third party module configured to execute the purchase of the securities in the custom portfolio.

Additionally, each security may include a remove button next to the security to remove the security from the custom portfolio. Similarly, an adjust button may be provided next to each security, allowing the user to easily adjust an allocation of the corresponding security. For example, if the user wants to increase or decrease the allocation of a specific security, each security on the user interface may have an allocation adjustment field, allowing the user to input a new allocation for that security.

Figure 6:
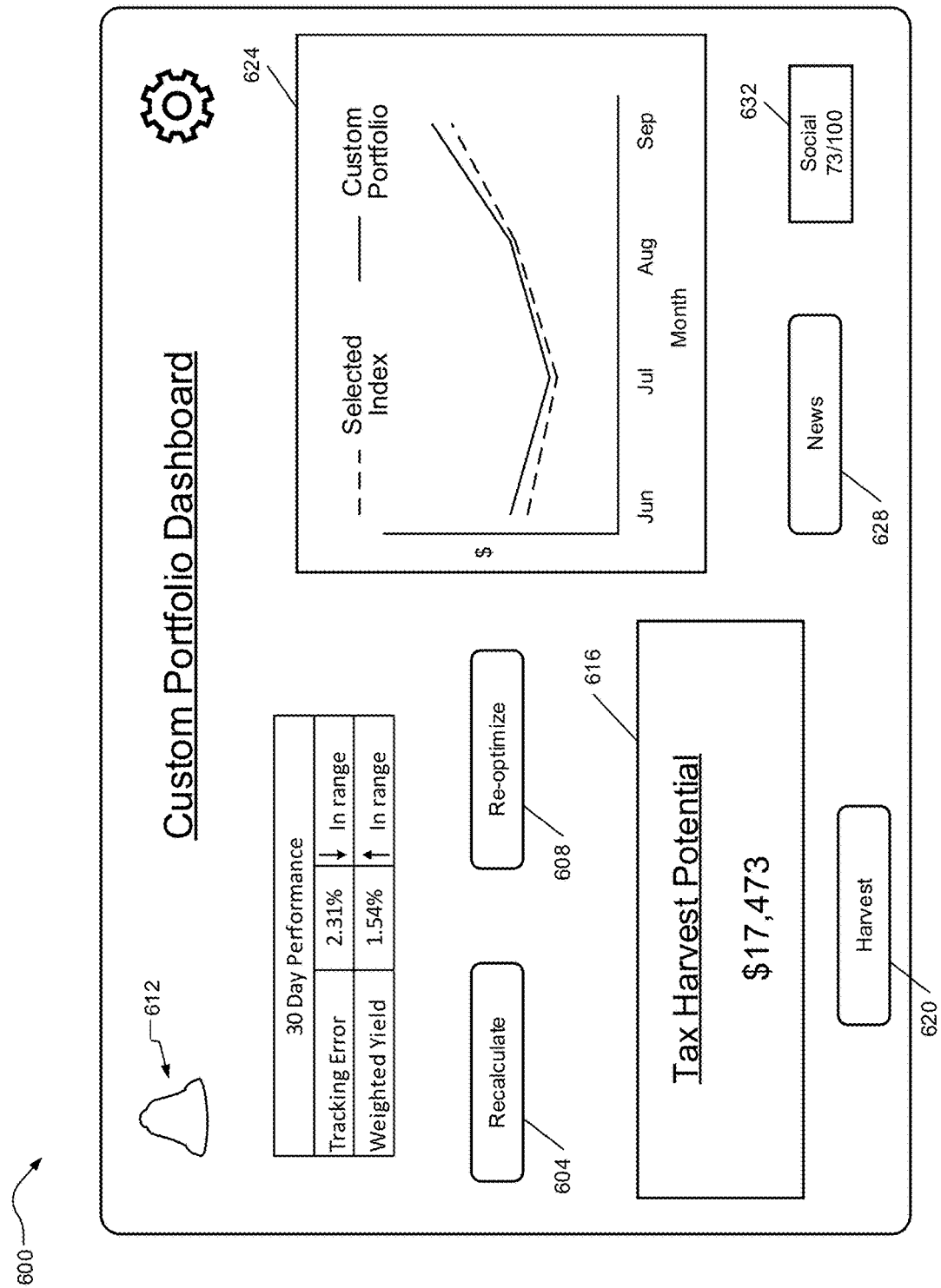
FIG. 6 is a representation of an example user interface of a custom portfolio dashboard.

FIG. 6 is a representation of an example user interface of a custom portfolio dashboard. Once the custom portfolio is purchased, the user may log in to their account with the financial entity and view a custom portfolio dashboard 600 that includes information about the performance of the custom portfolio, including a previous 30 day performance. The 30 day performance may include a tracking error and a weighted yield, which may be calculated for the custom portfolio at threshold intervals, such as, for example, daily. The list values may be calculated based on security parameters stored in the security parameter database 120.

In various implementations, the user may set threshold ranges for the listed values upon creation of the custom portfolio. The 30 day performance may indicate whether the corresponding values are within the user set threshold range. For example, the user may have set the tracking error to not exceed 3% and alert the user if the tracking error does exceed 3%. With the tracking error thresholds, the custom portfolio generation system indicates that the tracking error of the custom portfolio is still in range and will alert the user if the tracking error exceeds 3%.

In various implementations, if one of the listed values is out of range significantly enough (for example, beyond a second threshold or even the original threshold) to alert the user, the user may adjust the investments of the custom portfolio. A user may select a recalculate button 604 to determine if the listed values have changed. The recalculate button 604, upon selection, causes each of the listed values to be recalculated. In various implementations, the listed values may be calculated by a third party module, resulting in selection of the recalculate button 604 causing the custom portfolio generation module to obtain the listed values from the third party module. The historical calculations of the listed values may be stored in the account parameter database 116 of FIG. 1.

Similarly, the custom portfolio along with the parameters that created the portfolio may be stored in the account parameter database 116 of FIG. 1. On the custom portfolio dashboard 600, the user may select a re-optimize button 608 to generate the custom module using the same criteria as previously used to rebalance the custom portfolio if one of the listed values is out of range. In various implementations, the user may set an alert based on a price of a particular security exceeding or falling below a set price or an allocation of a particular security exceeding or falling below a set allocation.

When a price or allocation alert is triggered, the user may want to re-optimize or rebalance the custom portfolio as well. In various implementations, a notification icon 612 may indicate a number of alerts that the custom portfolio generation system has generated. Upon selection of the notification icon 612, the user may be directed to a page listing what alerts were generated and to which security the alert corresponds. Additionally or alternatively, the user may set the custom portfolio generation system to send the user a text, email, etc. in response to an alert being generated.

The custom portfolio dashboard 600 also includes a tax harvest potential 616 listing an amount of losses that may be realized within the custom portfolio. That is, the custom portfolio generation system sums the losses across the securities included in the custom portfolio and presents the total as the tax harvest potential 616 (here, $17,473). If the user would like to realize the losses listed in the tax harvest potential 616 (for example, to offset gains), the user may select a harvest button 620. Upon selection, the harvest button 620 directs a user to a screen listing each security with a loss. From the screen, the user can execute a sale of the securities to realize the losses for tax purposes.

The custom portfolio dashboard 600 may also include a performance graph 624, comparing the performance of the originally selected index and the custom portfolio over a period. The custom portfolio dashboard 600 may also include a news button 628, which, upon selection, directs a user to a page with links to news articles related to securities or sectors in the user's portfolio. The custom portfolio dashboard 600 may also include a social score 632 of the securities included in the custom portfolio.

Figure 7:
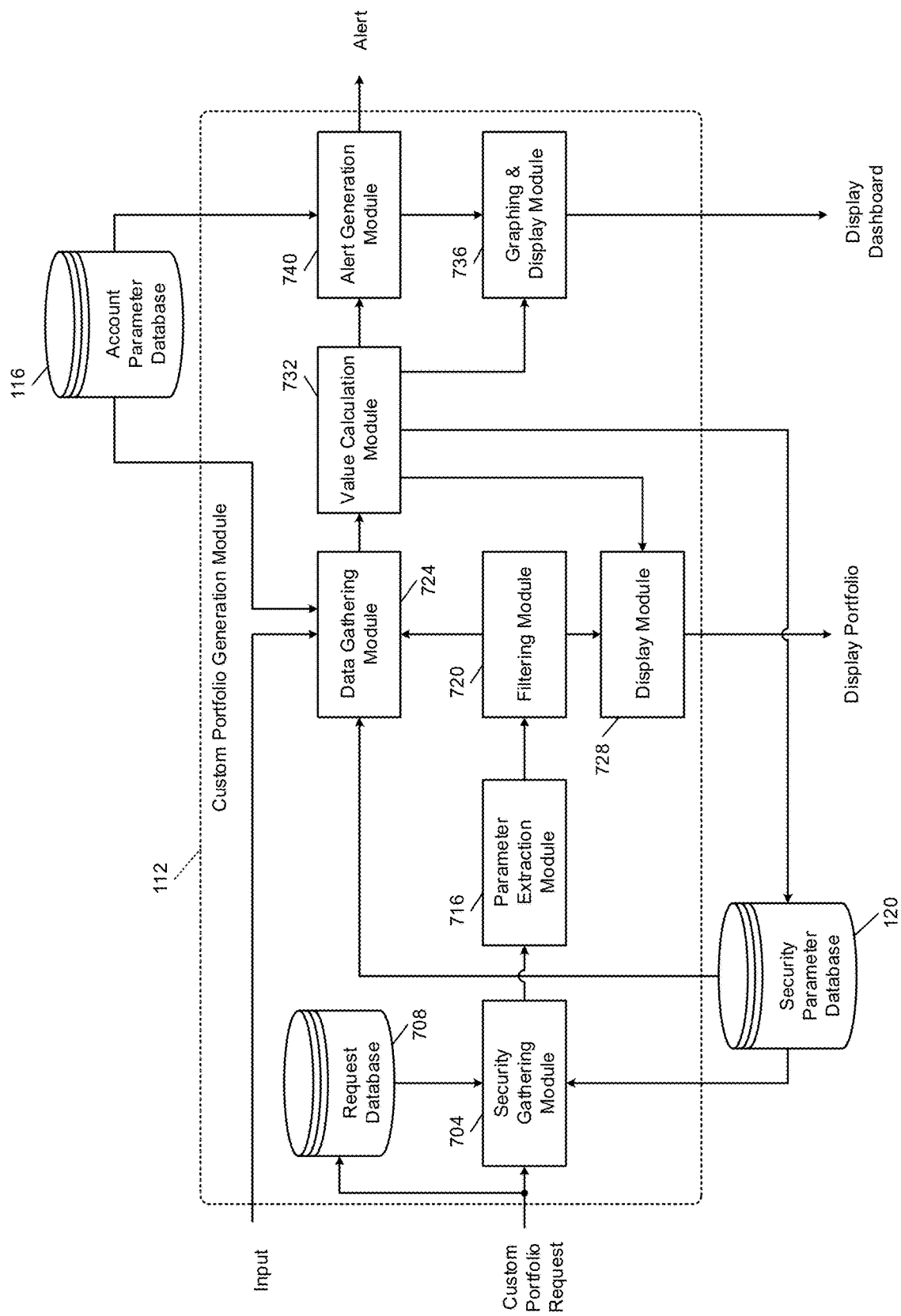
FIG. 7 is a functional block diagram of an example custom portfolio generation module.

FIG. 7 is a functional block diagram of an example custom portfolio generation module 112. The custom portfolio generation module 112 includes a security gathering module 704 that receives a custom portfolio request from the user device 104 of FIG. 1. The custom portfolio requests may be stored in a request database 708 (or the account parameter database 116), indexed by user account identifier. The custom portfolio request may be a new custom portfolio request from a user logged into their account or it may be a re-optimization or rebalancing request.

If the request is a new custom portfolio request, the parameters of the request are obtained from the user interface prompts shown in FIGS. 2-4. Alternatively, if the custom portfolio request is a re-optimization request (as shown in FIG. 6), the security gathering module 704 may obtain the custom portfolio request parameters from the request database 708 that corresponds to the user account identifier and corresponding custom portfolio.

The security gathering module 704 obtains a set of securities from the security parameter database 120 that are included in a selected index indicated in the custom portfolio request. The security gathering module 704 forwards the collected set of securities to a parameter extraction module 716. The parameter extraction module 716 extracts additional parameters included in the custom portfolio request, such as a number of holdings, excluded sectors, included single securities, allocation ranges, tilt, etc.

The extracted parameters and the set of securities are forwarded to a filtering module 720. The filtering module 720 filters the set of securities based on the extracted parameters. For example, if the user input a limit on the number of holdings, the filtering module 720 may adjust the set of securities to match the requested number of holdings. However, filtering according to the extracted parameters may occur in a specified order. For example, the filtering module 720 may first determine if the extracted parameters indicated excluded sectors or specific securities and first remove those from the set of securities. Additionally, the filtering module 720 may filter according to the number of holdings as a final filtering step to ensure that the set of securities are only reduced based on the number of holdings after the set of securities are reduced based on other exclusions or tilt requests.

The filtered set of securities is forwarded to a data gathering module 724 and a comparison & display module 728. In various implementations, the comparison & display module 728 may receive the filtered set of securities and display a list of the filtered securities that are included in the custom portfolio, along with data corresponding to the securities (for example, the sector, price, etc. shown in FIG. 5). In various implementations, the display module 728 may further receive calculations from a value calculation module 732 for display (as shown in FIG. 5).

The data gathering module 724 obtains historical performance data from the securities included in the custom portfolio and the originally selected index over a threshold time, such as four months, from the security parameter database 120. The historical performance data is forwarded to the value calculation module 732 to calculate the historical tracking error and the weighted average yield. The calculations are forwarded to the display module 728 to display the calculations on the user interface of the user device. The calculations are also forwarded for storage in the security parameter database 120. In various implementations, when the user logs in, the custom portfolio generation module 112 may obtain the values displayed on the custom portfolio dashboard from the security parameter database 120.

In various implementations, the data gathering module may receive input in the form of a user selecting a recalculate button or an interval calculation request of custom portfolios. As described previously, the custom portfolio generation module 112 may calculate values on the custom portfolio dashboard 600 shown in FIG. 6 at threshold intervals, such as hourly or daily. Therefore, when the data gathering module 724 receives input indicating the user is selecting a recalculate button or the input is an interval calculation request, the data gathering module obtains historical performance data for the securities included in the custom portfolio (as indicated by the input from the user account identifier) and historical performance data of the underlying index the custom portfolio was built to represent is obtained from the security parameter database 120.

In various implementations, the data gathering module 724 identifies the securities of the custom portfolio of the user account identifier based on data stored in the account parameter database 116. In various implementations, when the data gathering module 724 receives input, the historical data is obtained for a threshold period of, for example, a previous 30 days. In various implementations, the input may include when a user logs in to view the custom portfolio dashboard.

The gathered historical data is forwarded to the value calculation module 732 to calculate the values (tracking error and weighted yield). In various implementations, the input may include an indicator instructing the value calculation module 732 to also calculate a tax harvest potential by identifying each security in the custom portfolio with a loss and summing the losses. In various implementations, the data gathering module may also obtain one or more of the listed values from a third party module and transmit a request to receive the corresponding values from the third party module.

The calculated values are forwarded to a graphing & display module 736. The graphing & display module 736 receives the historical data (including security price) over the threshold period to graph the chart shown in FIG. 6 comparing performance of the index to the performance of the custom portfolio. The graphing & display module 736 also transform the custom portfolio dashboard interface to depict the calculated values. In various implementations, upon user log in, the custom portfolio generation module 112 may obtain the most recent calculations and performance data from the security parameter database 120.

The calculated values are also forwarded to an alert generation module 740. The alert generation module 740 obtains any ranges the user may have set for the calculated values from the account parameter database 116 and determines if any values are out of range. Whether the values are out of range or not are forwarded to the graphing & display module 736 to include on the custom portfolio dashboard. In various implementations, if a value is out of range, the alert generation module 740 may generate an alert and transmit the alert to the user (for example, via email or text).

Figure 8:
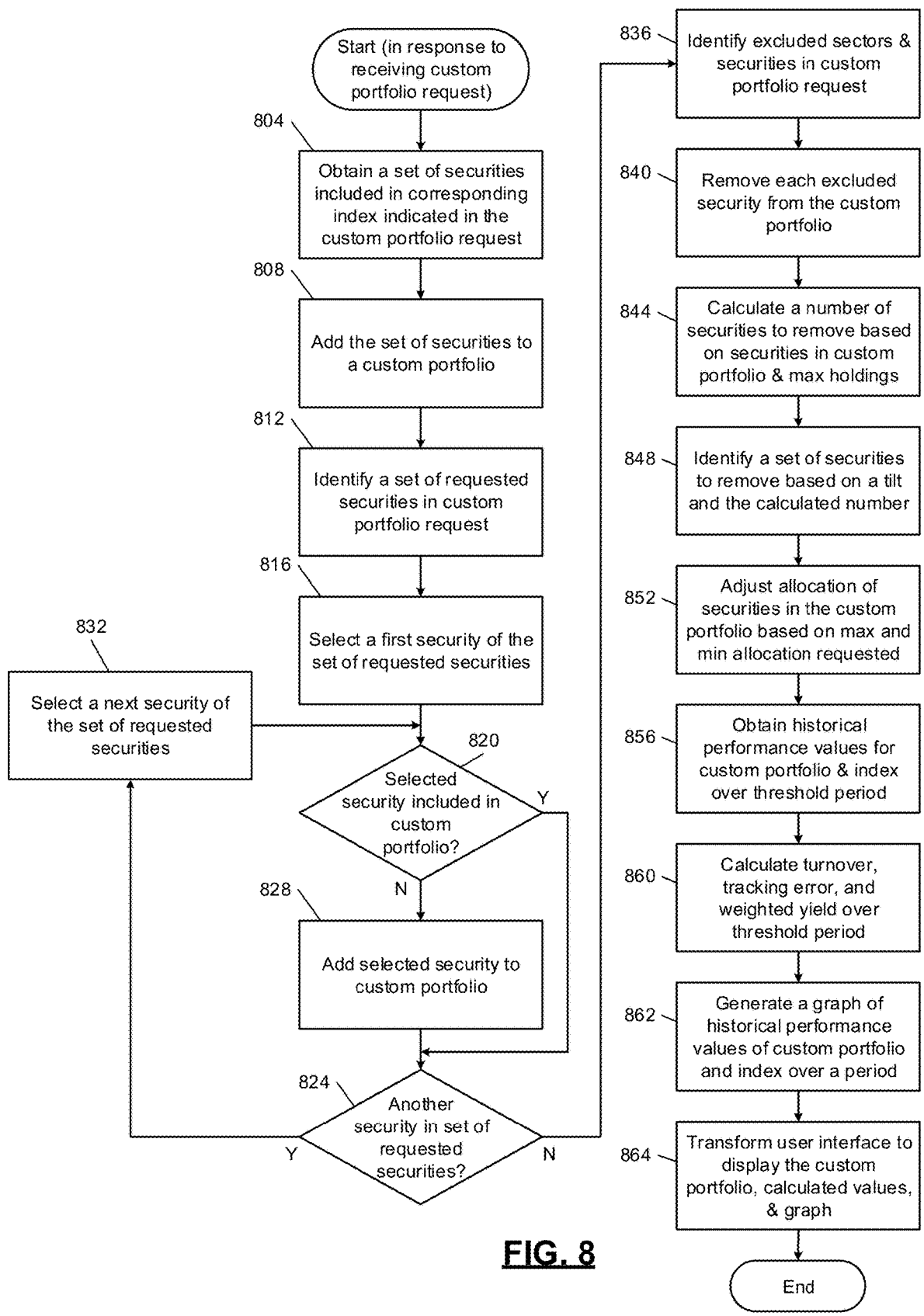
FIG. 8 is a flowchart depicting example generation of a custom portfolio based on user selections.

FIG. 8 is a flowchart depicting example generation of a custom portfolio based on user selections. Control begins in response to receiving a custom portfolio request. Control continues to 804 to obtain a set of securities included in a corresponding index indicated in the custom portfolio request. Control proceeds to 808 to add the set of securities to a custom portfolio. At 812, control identifies a set of requested securities in the custom portfolio request. Control continues to 816 to select a first security of the set of requested securities. At 820, control determines if the selected security is included in the custom portfolio. If yes, control proceeds to 824 to determine if another security is in the set of requested securities.

Otherwise, if the selected security is not included in the custom portfolio, control continues to 828 to add the selected security to the custom portfolio. Then, control proceeds to 824. At 824, if control determines another security is included in the set of requested securities, control proceeds to 832. At 832, control selects a next security of the set of requested securities and returns to 820. Otherwise, if, at 824, control determines there is not another security in the set of requested securities, control continues to 836.

At 836, control identifies excluded sectors & securities indicated in the custom portfolio request. Control continues to 840 to remove each security of the excluded sector and excluded security from the custom portfolio. Control proceeds to 844 to calculate a number of securities to remove based on securities in the custom portfolio and a requested number of holdings included in the custom portfolio request. That is, control determines if the custom portfolio has too many or too few holdings according to the requested number of holdings included in the custom portfolio request.

Control continues to 848 to identify a set of securities to remove or add based on a tilt and the calculated number. That is, to satisfy the requested number of holdings as well as the tilt indicated by the custom portfolio request, control may remove or add securities based on the tilt. For example, if the number of holdings is too high and the custom portfolio request indicated the user requested a high yield, control identifies which securities to remove to adjust the portfolio to the requested number of holdings and high yield. In various implementations, to match the requested tilt, control may add or reduce the number of holdings to be within a threshold number of the requested number of holdings.

Control continues to 852 to adjust the allocation of the securities of the custom portfolio according to user set maximum and minimum allocations. In various implementations, control adjusts specific security allocation and/or sector allocation based on the custom portfolio request. Control proceeds to 856 to obtain historical performance values for the custom portfolio and the corresponding index.

At 860, control calculates tracking error and weighted yield over threshold period based on the obtained historical data. Control may also calculate tax harvest potential. At 862, control generates a graph of historical performance values of the custom portfolio and the underlying index over a period. Control continues to 864 to transform a user interface to display the custom portfolio, calculated values, and graph. In various implementations, as shown in FIG. 5, the user interface also displays the number of holdings.

Figure 9:
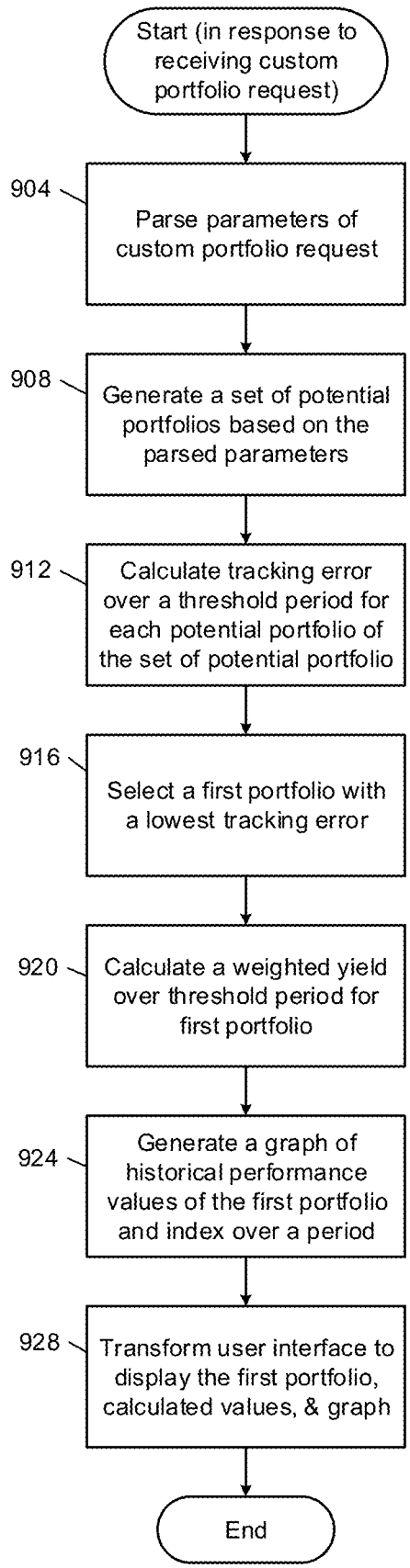
FIG. 9 is another flowchart depicting example generation of a custom portfolio based on user selections.

FIG. 9 is another flowchart depicting example generation of a custom portfolio based on user selections. Control begins in response to receiving a custom portfolio request. Control continues to 904 to parse the parameters of the custom portfolio request. The parameters may include a number of securities, allocation of securities by sector, tilt, specifically request securities, etc.

Control continues to 908 to generate a set of potential portfolios based on the parsed parameters. The set of portfolios may be a variety of numbers and may also include 250,000 distinct portfolios, fewer, or more. The set of potential portfolios follow the parsed parameters included in the custom portfolio request. Then, control continues to 912 to calculate the tracking error over a threshold period for each potential portfolio of the set of potential portfolios. Control proceeds to 916 to select a first portfolio with a lowest tracking error. In various implementations, another parameter may be used for selection of the first portfolio from the set of portfolios.

Control continues to 920 to calculate a weighted yield over the threshold period for the first portfolio. Then, control proceeds to 924 to generate a graph of the historical performance values of the first portfolio and index (indicated in the custom portfolio request) over a period. Control continues to 928 to transform a user interface to display the first portfolio, calculated values, and graph. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
 a memory configured to store:
  a parameter database including a plurality of asset identifiers, wherein each of the plurality of asset identifiers corresponds to (i) a respective index and (ii) a respective sector associated with the respective index; and
 at least one processor configured to execute instructions stored in the memory to configure the system to:
  obtain, from the parameter database, a set of asset identifiers corresponding to a first index received from a user device;
  assign each of the plurality of asset identifiers to one of a plurality of sectors, the plurality of sectors including at least a consumer sector, an energy sector and an industrial sector;
  transform an interface of the user device to display a graphical interface requesting selection of desired sectors from among the plurality of sectors and a representation ratio to allocate to each of the desired sectors;
  filter the set of asset identifiers based on the desired sectors;
  generate an adjusted set of asset identifiers by, for each of the desired sectors represented in the filtered set of asset identifiers, adjusting an allocation of asset identifiers associated with a corresponding sector based on the representation ratio of a corresponding one of the desired sectors;
  determine a tracking error between the adjusted set of asset identifiers and the first index;
  transform the interface of the user device by rendering a graphical depiction of performance of the adjusted set of asset identifiers and a graphical depiction of performance of the first index overlaying the graphical depiction of the performance of the adjusted set of asset identifiers on a same graph;
  transform the interface of the user device to display a tax harvest potential by (i) identifying ones of the adjusted set of asset identifiers having a loss over a threshold period, (ii) determining the tax harvest potential by summing the loss over the threshold period for each of the identified ones of the adjusted set of asset identifiers having the loss, and (iii) displaying the tax harvest potential on a same screen with the same graph of the graphical depiction of the performance of the adjusted set of asset identifiers and the graphical depiction of the performance of the first index; and
  selectively re-optimize the adjusted set of asset identifiers to reduce the tracking error, in response to the tracking error being greater than a threshold.

2. The system of claim 1 wherein:
 the instructions, when executed by the at least one processor, configure the system to transform the interface of the user device by rendering a graphical depiction of the representation ratio of the corresponding asset identifier, and
 the graphical depiction is represented as a percentage.

3. The system of claim 1 wherein the instructions, when executed by the at least one processor, configure the system to reduce a total number of asset identifiers included in the set of asset identifiers based on a requested number of assets included in a request signal from the user device.

4. The system of claim 1 wherein the instructions, when executed by the at least one processor, configure the system to:
 determine a number of asset identifiers in the set of asset identifiers; and
 in response to a requested number of assets being less than the number of asset identifiers in the set of asset identifiers, remove asset identifiers from the set of asset identifiers based on a type indication included in a request signal from the user device.

5. The system of claim 1 wherein the instructions, when executed by the at least one processor, configure the system to add an asset identifier to the set of asset identifiers in response to (i) a request signal from the user device identifying the asset identifier and (ii) the set of asset identifiers excluding the asset identifier.

6. The system of claim 1 wherein the instructions, when executed by the at least one processor, configure the system to remove an asset identifier from the set of asset identifiers in response to a request signal from the user device indicating an exclusion of the asset identifier.

7. The system of claim 1 wherein the instructions, when executed by the at least one processor, configure the system to:
 calculate a plurality of performance metric comparisons for the adjusted set of asset identifiers and the first index over a threshold period; and
 display the plurality of performance metric comparisons on the interface.

8. The system of claim 7 wherein the instructions, when executed by the at least one processor, configure the system to:
 graph at least one of the plurality of performance metric comparisons of the adjusted set of asset identifiers and the first index on a chart; and
 display the chart on the interface.

9. The system of claim 1 wherein the filtering the set of asset identifiers based on the desired sectors includes at least one of:
 including a first asset identifier of the set of asset identifiers if the first asset identifier corresponds to one of the desired sectors; and
 excluding the first asset identifier of the set of asset identifiers if the first asset identifier fails to correspond to one of the desired sectors.

10. The system of claim 1 wherein the instructions, when executed by the at least one processor, configure the system to,
 transform the interface of the user device to display a graphical interface requesting a minimum allocation percentage and a maximum allocation percentage for one or more of the adjusted set of asset identifiers, and wherein
  the allocation is adjusted based on the representation ratio such that the one or more of the adjusted set of asset identifiers within each of the desired sectors satisfy the minimum allocation percentage and the maximum allocation percentage associated therewith.

11. A method comprising:
 in response to receiving a request signal from a user device:
  obtaining, from a parameter database, a set of asset identifiers corresponding to a first index indicated in the request signal, wherein the parameter database includes a plurality of asset identifiers, and wherein each of the plurality of asset identifiers corresponds to (i) a respective index and (ii) a respective sector associated with the respective index;

assigning each of the plurality of asset identifiers to one of a plurality of sectors, the plurality of sectors including at least a consumer sector, an energy sector and an industrial sector;

transforming an interface of the user device to display a graphical interface requesting selection of desired sectors from among the plurality of sectors and a representation ratio to allocate to each of the desired sectors;

filtering the set of asset identifiers based on the desired sectors;

generating an adjusted set of asset identifiers by, for each of the desired sectors represented in the filtered set of asset identifiers, adjusting an allocation of asset identifiers associated with a corresponding sector based on the representation ratio of a corresponding one of the desired sectors;

determining a tracking error between the adjusted set of asset identifiers and the first index;

transforming the interface of the user device by rendering a graphical depiction of performance of the adjusted set of asset identifiers and a graphical depiction of performance of the first index overlaying the graphical depiction of the performance of the adjusted set of asset identifiers on a same graph;

transforming the interface of the user device to display a tax harvest potential by (i) identifying ones of the adjusted set of asset identifiers having a loss over a threshold period, (ii) determining the tax harvest potential by summing the loss over the threshold period for each of the identified ones of the adjusted set of asset identifiers having the loss, and (iii) displaying the tax harvest potential on a same screen with the same graph of the graphical depiction of the performance of the adjusted set of asset identifiers and the graphical depiction of the performance of the first index; and selectively re-optimizing the adjusted set of asset identifiers to reduce the tracking error, in response to the tracking error being greater than a threshold.

12. The method of claim 11 further comprising:
transforming the interface of the user device by rendering a graphical depiction of the representation ratio of the corresponding asset identifier, wherein the graphical depiction is represented as a percentage.

13. The method of claim 11 further comprising:
reducing a total number of asset identifiers included in the set of asset identifiers based on a requested number of assets included in the request signal.

14. The method of claim 11 further comprising:
determining a number of asset identifiers in the set of asset identifiers; and in response to a requested number of assets being less than the number of asset identifiers in the set of asset identifiers, removing asset identifiers from the set of asset identifiers based on a type indication included in the request signal.

15. The method of claim 11 further comprising:
adding an asset identifier to the set of asset identifiers in response to (i) the request signal identifying the asset identifier and (ii) the set of asset identifiers excluding the asset identifier.

16. The method of claim 11 further comprising:
removing an asset identifier from the set of asset identifiers in response to the request signal indicating an exclusion of the asset identifier.

17. The method of claim 11 further comprising:
calculating a plurality of performance metric comparisons for the adjusted set of asset identifiers and the first index over a threshold period; and displaying the plurality of performance metric comparisons on the interface.

18. The method of claim 17 further comprising:
graphing at least one of the plurality of performance metric comparisons of the adjusted set of asset identifiers and the first index on a chart; and displaying the chart on the interface.

19. The method of claim 11 wherein the filtering the set of asset identifiers based on the desired sectors includes at least one of:
including a first asset identifier of the set of asset identifiers if the first asset identifier corresponds to one of the desired sectors; and excluding the first asset identifier of the set of asset identifiers if the first asset identifier fails to correspond to one of the desired sectors.

20. The method of claim 11, further comprising:
transforming the interface of the user device to display a graphical interface requesting a minimum allocation percentage and a maximum allocation percentage for one or more of the adjusted set of asset identifiers, and wherein the allocation is adjusted based on the representation ratio such that the one or more of the adjusted set of asset identifiers within each of the desired sectors satisfy the minimum allocation percentage and the maximum allocation percentage associated therewith.

* * * * *